(12) United States Patent
Roland et al.

(10) Patent No.: US 9,154,769 B2
(45) Date of Patent: Oct. 6, 2015

(54) PARALLEL ONLINE-OFFLINE RECONSTRUCTION FOR THREE-DIMENSIONAL SPACE MEASUREMENT

(75) Inventors: Matthias Roland, Hannover (DE); Sebastian Jackisch, Ludwigsburg (DE); Alexander Fietz, Berlin (DE); Benjamin Pitzer, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 410 days.

(21) Appl. No.: 13/811,929

(22) PCT Filed: May 30, 2011

(86) PCT No.: PCT/EP2011/058792
§ 371 (c)(1),
(2), (4) Date: May 6, 2013

(87) PCT Pub. No.: WO2012/013388
PCT Pub. Date: Feb. 2, 2012

(65) Prior Publication Data
US 2013/0222544 A1    Aug. 29, 2013

(30) Foreign Application Priority Data

Jul. 28, 2010  (DE) .................. 10 2010 038 507

(51) Int. Cl.
*H04N 13/02* (2006.01)
*G01C 3/08* (2006.01)
*G01C 11/02* (2006.01)
*G01C 15/00* (2006.01)
*G06T 3/40* (2006.01)

(52) U.S. Cl.
CPC .................. *H04N 13/02* (2013.01); *G01C 3/08* (2013.01); *G01C 11/02* (2013.01); *G01C 15/00* (2013.01); *G01C 15/002* (2013.01); *G06T 3/4038* (2013.01)

(58) Field of Classification Search
CPC ........ G01C 11/02; G01C 11/00; G01C 15/00; G01C 15/002; G01C 3/08; G06T 3/4038; G06T 2200/04; G06T 2219/2004; H04N 13/02
USPC .......... 348/46, 42, 49, 50, 135, 137, 141, 142
IPC ....................................................... H04N 13/02
See application file for complete search history.

(56) References Cited

U.S. PATENT DOCUMENTS

2002/0175994 A1  11/2002  Sakakibara et al.
2012/0294534 A1*  11/2012  Watanabe et al. ............. 382/195

FOREIGN PATENT DOCUMENTS

CN     101029831 A   9/2007
DE     41 19 180 A1  12/1992
(Continued)

OTHER PUBLICATIONS

International Search Report corresponding to PCT Application No. PCT/EP2011/058792, mailed Sep. 21, 2011 (German and English language document) (5 pages).

*Primary Examiner* — Sherrie Hsia
(74) *Attorney, Agent, or Firm* — Maginot, Moore & Beck LLP

(57) ABSTRACT

A measurement apparatus for automatic three-dimensional measurement of space includes a camera sensor array that is configured to generate low-resolution video recordings. The camera sensor array is further configured to automatically generate high-resolution images at geometrically suitable positions in the space. Automatic recording of the high-resolution images is based on a three-dimensional real-time reconstruction of the video recordings. A measurement system includes the measurement apparatus and a corresponding method is implemented for the automatic three-dimensional measurement of the space.

11 Claims, 2 Drawing Sheets

(56) References Cited

FOREIGN PATENT DOCUMENTS

| | | |
|---|---|---|
| DE | 10 2006 054 324 A1 | 5/2008 |
| DE | 10 2008 002 241 A1 | 12/2009 |
| DE | 10 2008 054 453 A1 | 6/2010 |
| JP | 7-190763 A | 7/1995 |

* cited by examiner

PARALLEL ONLINE-OFFLINE RECONSTRUCTION FOR THREE-DIMENSIONAL SPACE MEASUREMENT

This application is a 35 U.S.C. §371 National Stage Application of PCT/EP2011/058792, filed on May 30, 2011, which claims the benefit of priority to Serial No. DE 10 2010 038 507.7, filed on Jul. 28, 2010 in Germany, the disclosures of which are incorporated herein by reference in their entirety.

BACKGROUND

The present disclosure relates to a measurement device and a measurement system for automatic three-dimensional measurement of a space. Furthermore, the disclosure relates to a corresponding method, a computer program element which can execute the method if it is executed on a processor and a computer readable medium on which the program element is stored.

Three-dimensional measurement of spaces is of great interest, e.g. for tradesmen and architects, for capturing the "actual state" of spaces as quickly as possible and, for example, for being able to plan upcoming work, such as the installation of kitchens, the installation of windows and paint jobs.

When carrying out a measurement, e.g. a user records with an instrument individual views of the space, from which it is possible to create a three-dimensional reconstruction of the space. However, the quality of the reconstruction depends on the geometric arrangement of the individual recordings in the space. Algorithmic expert knowledge of the user is required for an optimum arrangement of the individual views.

SUMMARY

An object of the present disclosure can therefore be considered that of providing an improved device and a method which make a higher quality three-dimensional reconstruction of a space possible.

This object can be achieved by the subject matter of the present disclosure. Advantageous embodiments of the present disclosure are described in the dependent claims.

The following discusses in detail features, details and possible advantages of a device according to embodiments of the disclosure.

According to a first aspect of the present disclosure, a measurement device is described for automatic three-dimensional measurement of a space. The measurement device has a camera sensor arrangement, which is designed to generate low-resolution video recordings and high-resolution images. The high-resolution images are created automatically at geometrically suitable positions in the space on the basis of a three-dimensional real-time reconstruction of the video recordings.

Automatic recording of the high-resolution images can occur without the necessity of assistance by a user. By way of example, automatic recording is triggered by a control or computational unit which is connected to the measurement device either directly or wirelessly.

Automatic recording can comprise the camera sensor being triggered and, optionally, the data being stored. Alternatively, automatic recording may mean that specific data is called from a memory.

By way of example, the camera sensor arrangement can have a high-resolution sensor which creates high-resolution images. In order to create the low-resolution video recordings, the high-resolution images can for example be scaled down. To this end, the camera arrangement can have a camera sensor which is capable of quickly changing between low-resolution live image and high-resolution individual recording. The high-resolution individual recordings can be stored or buffered and scaled down. The down-scaled recordings can be used for a three-dimensional real-time reconstruction. The high-resolution individual recordings situated in a memory or a buffer can be recalled for a subsequent or simultaneous high-quality reconstruction.

The camera sensor arrangement can alternatively have a first and a second camera sensor. The first camera sensor can be a high-resolution camera and the second camera sensor can be a video-capable camera.

The video recordings have a lower resolution than the high-resolution images. By way of example, the low resolution can relate to spatial details. The upshot of the low resolution is that the data size of the video recordings is smaller than that of the high-resolution images. As a result of the smaller data size, the video recordings can be processed live, i.e. in real-time. Processing can take place online, i.e. there is no need to buffer the data, and the processing results, i.e. the three-dimensional real-time reconstruction, can be transmitted as direct feedback to a user. The low resolution can be understood in terms of spatial resolution. Here, the time resolution of the video recordings can be high; for example, the video recordings can be recorded live with a high frame rate.

From the real-time reconstruction of the space it is possible to establish positions in the space which are geometrically suitable for recording high-resolution images. The geometrically suitable positions can be determined on the basis of landmarks in the low-resolution video recordings. The high-resolution images are high quality and have a greater data size than the video recordings. They can represent individual recordings at the suitable geometric positions in the space.

According to one exemplary embodiment, the measurement device furthermore has an output unit, which can output the three-dimensional real-time reconstruction. As a result of this, it is possible to realize feedback for the user and continuous user guidance to the suitable geometric positions in the space which are suitable for recording the high-resolution images. By way of example, the output unit can be embodied as a display.

According to a second aspect of the present disclosure, a measurement system is described for automatic three-dimensional measurement of a space. The measurement system has the measurement device illustrated above and a computational unit.

By way of example, the computational unit can be a laptop, a personal digital assistant (PDA) or a tablet PC. Furthermore, the computational unit can be connected wirelessly to the measurement device, i.e., for example, with the aid of electromagnetic signals, for example via Bluetooth or WLAN. The computational unit can alternatively be integrated directly into the measurement device.

The low-resolution video recordings recorded by the camera sensor arrangement are routed directly online to the computational unit. The computational unit creates a three-dimensional reconstruction of the space in real-time on the basis of these video recordings. The computational unit is furthermore designed, proceeding from the three-dimensional real-time reconstruction, to fix positions in the space at which high-resolution images are to be recorded. Establishing the suitable positions is based on a three-dimensional algorithm and likewise occurs in real-time, parallel to recording the video images and parallel to the three-dimensional real-time reconstruction. The computational unit is furthermore designed to trigger an automatic recording of the high-resolution images by the camera sensor arrangement.

According to one exemplary embodiment, following a recording of the high-resolution images, the computational unit is furthermore designed to create a second three-dimensional reconstruction on the basis of said high-resolution images. To this end, the high-resolution images can be stored after being recorded. As a result, the second three-dimensional reconstruction can occur offline, i.e. not in real-time. This can be advantageous because processing of the high-resolution images, which have a large data size, can be time consuming. Alternatively, the second three-dimensional reconstruction can occur parallel to the real-time reconstruction. The second three-dimensional reconstruction is more accurate than the real-time reconstruction, for example it may be richer in detail and closer to reality.

According to a third aspect of the present disclosure, a method is described for automatic three-dimensional measurement of a space. The method is suitable for operating or controlling the above-described measurement system.

According to a fourth aspect of the present disclosure, a computer program element is described, the latter being designed to execute the above-described method if it is executed on a processor.

According to a fifth aspect of the present disclosure, a computer readable medium is described, on which the aforementioned computer program element is stored.

The measurement device according to the disclosure, the measurement system and the method according to the disclosure have the following advantages: a very accurate high-quality three-dimensional reconstruction of a space to be measured is made possible. The reconstruction takes place in a fully automated fashion, as a result of which the accuracy and robustness are increased because there no longer is the need to make use of user knowledge. Furthermore, user guidance in real-time is made possible. As a result, it is possible to use the system even without expert knowledge about three-dimensional reconstructions. As a result of the real-time reconstruction based on the video recordings there furthermore is less time expenditure during the capture.

As a result of a plurality of processes, i.e. recording of video images, creating the three-dimensional real-time reconstruction and recording the high-resolution images, running in parallel, a fully automatic integration of subsequent recordings in previous high-quality three-dimensional reconstructions and a refinement of the initially determined space geometry can be made possible. Furthermore, it is subsequently also possible to integrate further sensor data, such as e.g. far-infrared (FIR), radar, terahertz (THz), X-ray and wall-scanner data, fully automatically into the existing three-dimensional space model.

Furthermore, an easily understandable live visualization is made possible. Furthermore, the obtained measurement results are brought into spatial context for the user in real-time.

BRIEF DESCRIPTION OF THE DRAWINGS

With reference to the attached drawings, a person skilled in the art will be able to identify further features and advantages of the present disclosure from the following description of exemplary embodiments that should not, however, be construed as restricting the disclosure.

DETAILED DESCRIPTION

All figures are merely schematic representations of devices according to the disclosure or of the components thereof and of the corresponding method steps. In the figures, distances and size relations in particular have not been reproduced true-to-scale. Corresponding elements are denoted by the same reference numbers in the various figures.

Figure 1A:
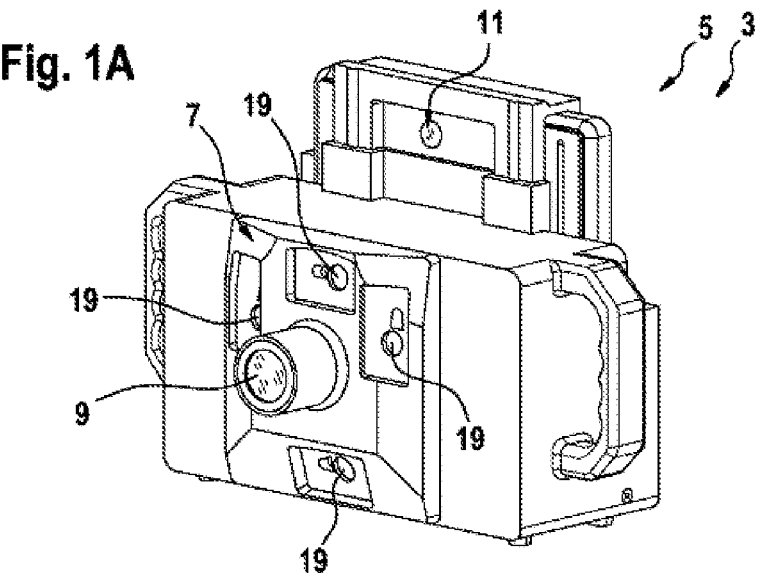
FIG. 1 schematically shows a front and rear view of a measurement system for automatic three-dimensional space measurement according to an exemplary embodiment of the disclosure.
Figure 1B:
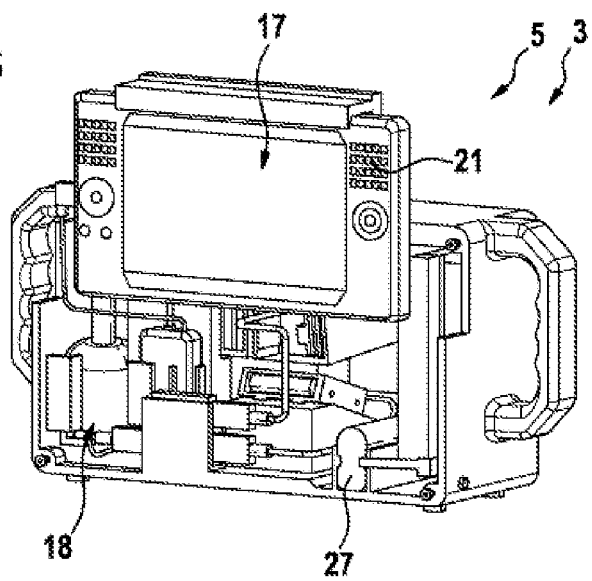

FIG. 1 illustrates a measurement device and a measurement system for automatic three-dimensional space measurement according to one exemplary embodiment of the disclosure. FIG. 1A shows the front view of the measurement system and FIG. 1B shows the rear view. The measurement device provides a concept for fully automatic recording of suitable high-resolution individual views and continuous user guidance through the interior space to be reconstructed in real-time is made possible.

According to the exemplary embodiment, the measurement system 5 has a camera arrangement 7. The latter consists of a first camera sensor 9 and a second camera sensor 11. The second camera sensor 11 is designed as a video-capable camera and the first camera sensor 9 is designed as a high-resolution camera.

The measurement device 3 and the measurement system 5 furthermore have position measurement devices 18, 19. The position measurement devices 18 on the front side of the measurement device 3 are designed as a plurality of single-ray laser rangefinders 18 which are calibrated relative to the camera. On the rear side of the measurement device 3 in FIG. 1B, the position measurement devices 19 are designed as kinematic sensors 19, such as e.g. accelerometers, rotation rate sensors and/or position sensors. The position measurement devices 18, 19 can supply data that makes it possible to determine the position of the measurement device 3 in the space, such as e.g. x-, y- and z-coordinates. Furthermore, the position measurement devices 18, 19 can supply data that makes it possible to determine the orientation of the measurement device, such as e.g. tilt angles with respect to horizontal and vertical axes.

In particular, distance-measurement data, for example with the aid of the laser rangefinder 18, can be used for metric scaling of high-resolution images. This data can furthermore be used for the three-dimensional real-time reconstruction 23 and for the second accurate reconstruction 25.

Furthermore, the data established with the aid of kinematic sensors 19 can for example be used for an ex ante alignment of the coordinate system of the measurement device 3.

Figure 3:
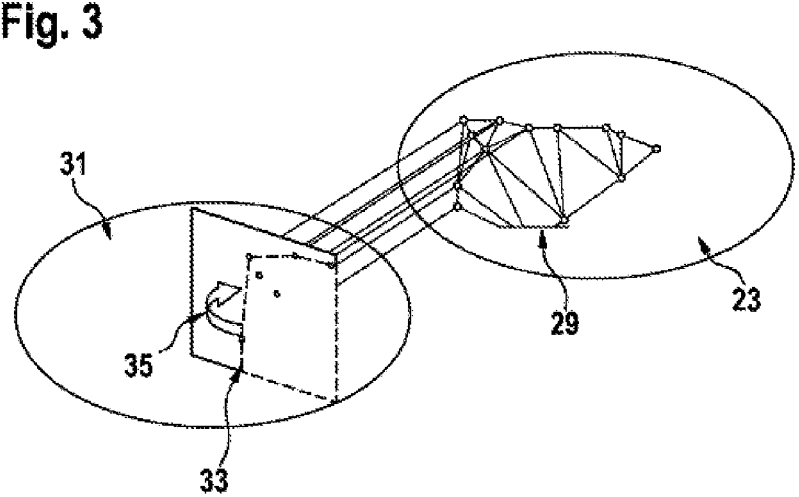
FIG. 3 schematically shows a real-time reconstruction and user guidance according to an exemplary embodiment of the disclosure.

The measurement device furthermore has an output unit 17. The latter is arranged on the side facing the user and is for example designed as a display which is capable of displaying a live-image from the video camera and, superposed thereon, a real-time reconstruction of the space. As illustrated in FIG. 3, user guidance 35 can be realized on the output unit by virtue of superposing video recordings 31 and real-time reconstructions 23.

The measurement system 5 is furthermore equipped with a computational unit 21. In the illustrated exemplary embodiment, the computational unit 21 is directly integrated into the system. Alternatively, the computational unit could be an external instrument, such as e.g. a laptop or a PDA, which is connected, e.g. wirelessly, to the measurement device 3. The measurement device 3 furthermore has a housing, suitable lateral handles and an energy source 27 such as e.g. a rechargeable battery. The measurement system 5 and the measurement device 3 can be manually guided instruments and optionally be integrated in manual tools.

Figure 2:
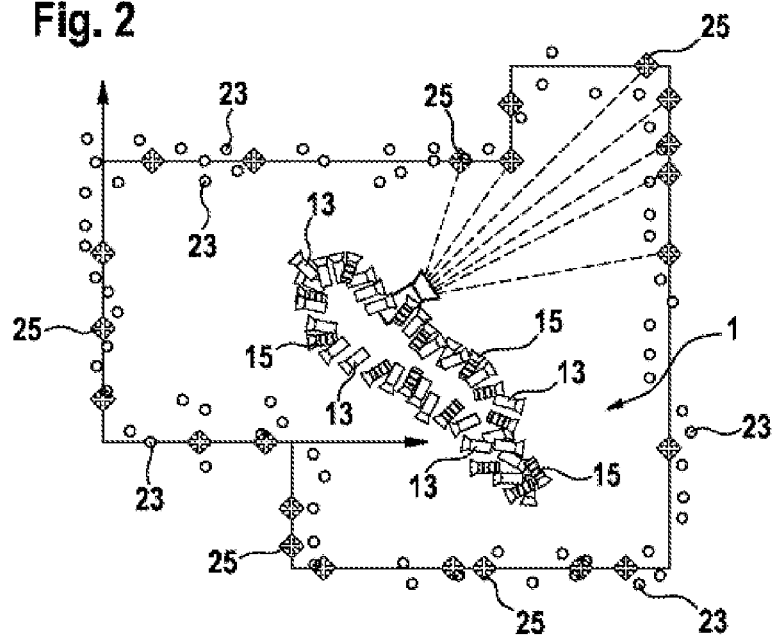
FIG. 2 schematically shows a plan view of a space to be measured, with recording positions and reconstruction results according to an exemplary embodiment of the disclosure.

FIG. 2 schematically shows a plan view of a space to be measured, with recording positions and reconstruction results according to an exemplary embodiment of the disclosure. For the purposes of space measurement, a user can enter the space 1 with the measurement device 3 and initialize the measurement by, for example, switching on the camera 9, 11.

Alternatively, the initialization can take place as follows: in order to define an intuitive coordinate system, the measurement system 5 or the measurement device 3 can be initialized by a recording in a corner of the space, which subsequently represents the spatial coordinate system of a three-dimensional reconstruction. It is possible to initialize a rough real-time localization of the measurement system 3 with the aid of a recording overlapping with the first recording.

After the measurement has started, the user can move through the space 1 with the measurement device 3. By way of example, he can move along the space with his back against the wall. After the measurement is initialized, the second camera sensor 11 automatically records low-resolution live video images. These can be seen by the user on output unit 17 directly on the rear side of the measurement device 3. The live video recordings are transmitted to the computational unit 21. There, a three-dimensional real-time reconstruction of the space is created in real-time. As shown in FIG. 3, the real-time reconstruction 23 can be projected into the live image from the second camera sensor 11 on the output unit 17. By way of example, the real-time reconstruction 23 can be superposed onto the video recording 31 in a semi-transparent fashion. As a result of this, the user obtains online feedback in respect of the status of the reconstruction, i.e. in real-time.

The space points calculated within the scope of the real-time reconstruction 23 are illustrated as circles in FIG. 2. The real-time reconstruction 23 based on the video recordings constitutes a rough approximation, which can be seen from the deviation of the points 23 from the actual space boundaries.

The computational unit 21 determines geometrically suitable positions 15 in the space, which are suitable for recording a high-resolution individual view with the aid of the first camera sensor 9.

The high-resolution recordings are suitable for a high-quality and accurate three-dimensional reconstruction 25. In FIG. 2, the second three-dimensional reconstruction 25 is illustrated by crosses. The accuracy of the reconstruction can be seen from the fact that the crosses are situated directly on the space boundaries. The geometrically suitable positions 15 of the measurement device 3 in the space 1 are indicated by striped cameras.

The computational unit 21 initiates the automatic recording of the high-resolution images by the first camera sensor 9. The high-resolution individual views can be used to refine the real-time reconstruction in a post-processing step. The post-processing can be improved e.g. in respect of its robustness and speed by data relating to the position and the orientation of the measurement system at the time of the recording.

This data and information can be provided with the aid of the position measurement devices 18, 19. For the video recordings and also for the high-resolution images, the laser rangefinders 18 can be designed to respectively determine a distance from at least one reference point in the space. Here, the current position of the measurement device can be determined with respect to reference points or landmarks in the video recordings. In this case, landmarks can for example be prominent feature points, such as e.g. door frames or power points, in the respective recordings. By way of example, the three-dimensional real-time reconstruction and/or the very accurate second three-dimensional reconstruction can be metrically scaled, i.e. provided with a scale, on the basis of the distance measurement. Hence the data from the distance measurements can be used in the three-dimensional reconstruction or modeling.

The computational unit furthermore calculates a second accurate three-dimensional reconstruction on the basis of the high-resolution images. By way of example, this calculation can take place offline. To this end, the high-resolution images can be stored. Alternatively, the real-time user guidance via video data can be combined with the accurate three-dimensional reconstruction on the basis of the high-resolution individual recordings. The clear visualization of the measurement results, for example on the output unit 17, can be improved by means of augmented reality.

The measurement system, which realizes a measurement of the three-dimensional geometry of an interior space in combination with real-time-capable three-dimensional user guidance, can execute a plurality of work processes running parallel. Rough real-time tracking of the measurement system via the video-capable camera 11, optionally supported by inertial and/or kinematic sensors 19 and automatic recording of geometrically suitable high-resolution individual views by the camera 9 runs parallel to a rough three-dimensional real-time reconstruction 23 of the space geometry, by means of which the measurement system can be localized online. A further procedure, specifically the very accurate three-dimensional reconstruction 25, based on the automatically generated individual views and the available a priori information in respect of the rough position and orientation of the measurement system 3 at the time of the individual recording can likewise run parallel to or subsequently to the aforementioned procedures.

In detail, the real-time tracking and the recording of the high-resolution individual recordings is carried out by the following steps: detecting simple natural landmarks in the recordings; searching for corresponding points in a permanently updating initial reconstruction; determining the current measurement system position and orientation using corresponding features in current frames of the initial reconstruction; determining suitable frames for the rough three-dimensional real-time reconstruction 23 and transmitting these frames to a second procedure; determining good geometric conditions for high-resolution individual recordings and triggering the high-resolution camera 9 with subsequent transmission of these individual recordings and the associated camera positions to a third procedure. The procedure of the rough real-time reconstruction 23, running in parallel, can in detail have the following steps: processing the frames from the real-time tracking system; integrating natural landmarks in these frames into the existing initial reconstruction; updating the initial reconstruction by local and fast optimization methods.

The further parallel or alternatively subsequently carried out procedure of the very accurate second three-dimensional reconstruction 25 on the basis of the individual recordings can comprise the following steps: detecting complex and very accurate natural landmarks in the high-resolution individual recordings; optionally detecting natural edge features in order to be able to provide texture-weak regions also with image features; determining corresponding features between the individual recordings while restricting the search space using a priori position information from the first procedure, as a result of which the robustness and evaluation speed can be increased; automatic three-dimensional reconstruction 25 of the corresponding image features to form a very accurate three-dimensional dotted-line cloud; three-dimensional modeling of the very accurate three-dimensional reconstruction and the optionally integrated laser measurements to form a three-dimensional CAD space model.

FIG. 3 schematically illustrates a real-time reconstruction and the user guidance according to an exemplary embodiment of the disclosure. A real-time reconstruction 23, which takes place online, is indicated schematically in the right-hand ellipse. To this end, a triangulated three-dimensional mesh 29 for example can be modeled. The live image from the video recording 31 is indicated in the left-hand ellipse. The three-dimensional real-time reconstruction 23 can be projected into the two-dimensional image of the video recording 31. By way of example, this projection can be superposed in a semi-transparent fashion onto the live image from the video recording 31. The superposition is indicated by the reference number 33. The user guidance 35 is indicated by an arrow.

As a result of the fast and rough real-time localization, the measurement system always knows at any time where it is currently located within the interior space and how good the previous three-dimensional reconstruction is. The current position can thus firstly be visualized online for the user and the latter can be provided with feedback in respect of the previous status of the measurement. By way of example, this can be brought about using a traffic-light color scheme, e.g. green for a high-quality real-time reconstruction, yellow for an inaccurate real-time reconstruction and red for no real-time reconstruction. Alternatively, the user can be guided to the desired position by arrows. As a result of the online visualization, the user can easily identify which regions of the interior space were captured and which ones still have to be processed.

As shown in FIG. 3, the user guidance can be further optimized by meshing the online reconstructed three-dimensional point cloud. To this end, a triangulation of the data is calculated directly and likewise in real-time for the three-dimensional point cloud created online. The three-dimensional mesh of the previously reconstructed regions obtained thus for any time can now be projected back into the live image from the camera. As a result of a skillful visualization it is possible to mark the regions in the image for which it was already possible to calculate a three-dimensional geometry. Additionally supporting image information, such as, for example, the arrow shown in FIG. 3, can actively guide the user to a complete capture of the space geometry.

By way of example, if the real-time tracking is interrupted, it is possible to resume the space measurement by virtue of a previously recorded region of the interior space being registered anew. By storing the recorded images and the information obtained therefrom, this is rendered possible as follows: by way of example, the user moves the measurement device 3 until previously stored landmarks are recovered in the live recordings and the system re-localizes itself. The user can then continue the measurement of the space 1 at this point.

Finally, it is noted that expressions such as "having" or the like should not exclude the possibility of the provision of further elements or steps. Furthermore, reference is made to the fact that "a" or "an" does not exclude a number of items. Moreover, features described in conjunction with the various embodiments can be combined together as desired. Furthermore, reference is made to the fact that the reference signs in the claims should not be construed as restricting the scope of the claims.

The invention claimed is:

1. A measurement device for automatic three-dimensional measurement of a space, comprising:
    a camera sensor arrangement configured to (i) generate low-resolution video recordings and (ii) generate high-resolution images automatically at geometrically suitable positions in the space,
    wherein the automatic recording of the high-resolution images is based on a three-dimensional real-time reconstruction of the video recordings.

2. The measurement device as claimed in claim 1, further comprising an output unit configured to output the three-dimensional real-time reconstruction so as to realize continuous user guidance in real-time.

3. The measurement device as claimed in claim 1, further comprising a position measurement device configured to respectively determine a distance from at least one reference point in the space for the video recording and for the high resolution images.

4. A measurement system for automatic three-dimensional measurement of a space, comprising:
    a measurement device including:
        a camera sensor arrangement configured to (i) generate low-resolution video recordings and (ii) generate high-resolution images automatically at geometrically suitable positions in the space,
        wherein the automatic recording of the high-resolution images is based on a three-dimensional real-time reconstruction of the video recordings; and
    a computational unit configured to (i) create the three-dimensional real-time reconstruction on the basis of the video recordings, (ii) determine positions in the space on the basis of the three-dimensional real-time reconstruction, and (iii) initiate an automatic recording of high-resolution images at the determined positions,
    wherein the determined positions are geometrically suitable for recording images which are to underlie the three-dimensional reconstruction of the space.

5. The measurement system as claimed in claim 4, wherein the computational unit is further configured to create a second three-dimensional reconstruction on the basis of the high-resolution images.

6. A method for automatic three-dimensional measurement of a space comprising:
    generating low-resolution video recordings;
    creating a three-dimensional real-time reconstruction on the basis of the low-resolution video recordings;
    determining positions in the space on the basis of the three-dimensional real-time reconstruction, the determined positions being geometrically suitable for recording images which are to underlie the three-dimensional reconstruction of the space; and
    automatically recording high-resolution images at the determined positions.

7. The method as claimed in claim 6, further comprising:
    outputting the three-dimensional real-time reconstruction on an output unit; and
    guiding a user to the positions determined for recording the high-resolution images.

8. The method as claimed in claim 6, further comprising:
    determining a current position of a measurement device through which the low-resolution video recordings are generated in the space; and
    using the current position in the three-dimensional real-time reconstruction, wherein the current position of the measurement device is determined with reference to reference points in the low-resolution video recordings.

9. The method as claimed in claim 6, further comprising:
creating a second three-dimensional reconstruction on the basis of the high-resolution images,
wherein the second three-dimensional reconstruction is more accurate than the three-dimensional real-time reconstruction.

10. The method as claimed in claim 6, wherein the method is executed by a computer program element configured to execute the method on a processor.

11. The method as claimed in claim 10, wherein the computer program element is stored on a computer readable medium.

* * * * *